(12) United States Patent
Gao et al.

(10) Patent No.: US 9,215,596 B2
(45) Date of Patent: Dec. 15, 2015

(54) METHOD AND APPARATUS FOR ESTIMATING A REGION OF COVERAGE FOR A SPARSE NETWORK ALMANAC

(71) Applicant: QUALCOMM Incorporated, San Diego, CA (US)

(72) Inventors: Weihua Gao, San Jose, CA (US); Gengsheng Zhang, Cupertino, CA (US); Sai Pradeep Venkatraman, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 14/018,324

(22) Filed: Sep. 4, 2013

(65) Prior Publication Data

US 2015/0065150 A1 Mar. 5, 2015

(51) Int. Cl.
  *H04W 16/00* (2009.01)
(52) U.S. Cl.
  CPC ................................ *H04W 16/00* (2013.01)
(58) Field of Classification Search
  CPC ...................................................... H04W 16/00
  USPC .................... 455/446, 456.1, 456.3, 456.5
  See application file for complete search history.

(56) References Cited

U.S. PATENT DOCUMENTS

| | | | |
|---|---|---|---|
| 7,822,427 B1* | 10/2010 | Hou | 455/456.2 |
| 8,634,850 B2* | 1/2014 | Moeglein | 455/456.1 |
| 8,849,306 B1* | 9/2014 | McMullen et al. | 455/456.1 |
| 2008/0125144 A1 | 5/2008 | Ruutu et al. | |
| 2010/0331013 A1 | 12/2010 | Zhang | |
| 2011/0039576 A1 | 2/2011 | Prakash et al. | |
| 2011/0059756 A1* | 3/2011 | Moeglein et al. | 455/456.5 |
| 2012/0244882 A1* | 9/2012 | Wilson et al. | 455/456.2 |
| 2012/0309376 A1* | 12/2012 | Huang et al. | 455/418 |
| 2013/0035111 A1 | 2/2013 | Moeglein et al. | |
| 2013/0150055 A1* | 6/2013 | Laroia | H04W 16/12 455/443 |
| 2013/0288717 A1* | 10/2013 | Choi | H04W 4/021 455/456.3 |

* cited by examiner

*Primary Examiner* — Cong Tran
(74) *Attorney, Agent, or Firm* — Silicon Valley Patent Group LLP (57) ABSTRACT

A level 3 (L3) sparse network almanac (SNA) is generated using data from a base station almanac with information for a plurality of base stations. The information for base stations includes cell identifiers that include an L3 region code that is one layer above a cell tower identification level. Cell boundaries are determined from the base station information. The cell boundaries are used to estimate a region of coverage for the L3 SNA, which may be stored in a database. For example, region points may be generated from the cell boundaries, and used to estimate the region of coverage for the L3 SNA. The region of coverage may be determined, e.g., as a minimum enclosing circle or other similar techniques. The larger of an estimated region size parameter, e.g., a radius of a circle, and a default size may be used for the region of coverage.

31 Claims, 5 Drawing Sheets

METHOD AND APPARATUS FOR ESTIMATING A REGION OF COVERAGE FOR A SPARSE NETWORK ALMANAC

BACKGROUND

1. Background Field

This disclosure relates generally to systems, apparatus and methods for estimating a position for a base station, and more particularly to estimating the coverage area of the level 3 region to which a base station belongs.

2. Relevant Background

Obtaining accurate position information for mobile devices, such as cellular telephones or other wireless communication devices, is becoming prevalent in the communications industry. A common means to determine the location of a device is to use a satellite positioning system (SPS), such as the well-known Global Positioning Satellite (GPS) system or Global Navigation Satellite System (GNSS), which employ a number of satellites that are in orbit around the Earth.

An SPS positioning system requires that the mobile device lock on to signals from a number of satellites, e.g., at least four, that are visible from the current position of the mobile device. If a mobile device is moved a significant distance while the SPS positioning system is turned off, e.g., when a user travels by airline to another city, the mobile device will need to acquire a new set of satellite signals to perform a position fix. The mobile device, accordingly, must perform a cold start as the last position fix of the mobile device is unknown. A cold start may take a considerable time, as long as twelve minutes, because the receiver must search through all of the codes and frequency combinations to locate a satellite at the new position. With an approximate position fix for the mobile device, however, the number of satellites that are possibly visible to the mobile device can be reduced and consequently, the time required to search for satellite signals may be reduced.

A terrestrial based position fix, e.g., using known locations of base stations with which the mobile device is in wireless communication, is a commonly used technique for obtaining an approximate position fix. Base station locations may be stored in a base station almanac (BS almanac) database and may be communicated to the mobile device via the base station. Typically, BS almanac databases are built up over time based on, e.g., crowdsourced information for the base stations. While a BS almanac database is being built, or when new base stations are added to a wireless network, the BS almanac database may be incomplete. Consequently, mobile devices in contact with a base station that is not yet included in the BS almanac database may not be able to acquire an approximate position fix from that base station, which may markedly increase the time required to achieve a satellite lock.

SUMMARY

A level 3 (L3) sparse network almanac (SNA) is generated using data from a base station almanac with information for a plurality of base stations. The information for base stations includes cell identifiers that include an L3 region code that is one layer above a cell tower identification level. Cell boundaries are determined from the base station information. The cell boundaries are used to estimate a region of coverage for the L3 SNA, which may be stored in a database. For example, region points may be generated from the cell boundaries, and used to estimate the region of coverage for the L3 SNA. The region of coverage may be determined, e.g., as a minimum enclosing circle or other similar techniques. The larger of an estimated region size parameter, e.g., a radius of a circle, and a default size may be used for the region of coverage.

In one implementation, a method of estimating a region of coverage for a sparse network almanac includes receiving a base station almanac with information for a plurality of base stations, wherein the information for each base station in the plurality of base stations includes a cell identifier that includes a level 3 (L3) region code that is one layer above a cell tower identification level; determining cell boundaries from the information for each base station; and using the cell boundaries from the information for each base station to estimate a region of coverage for an L3 sparse network almanac (SNA).

In one implementation, an apparatus for estimating a region of coverage for a sparse network almanac includes an external interface configured to receive a base station almanac with information for a plurality of base stations; and a processor configured to determine cell boundaries from the information for each base station in the plurality of base stations, and to use the cell boundaries from the information for each base station to estimate a region of coverage for a level 3 (L3) sparse network almanac (SNA).

In one implementation, an apparatus for estimating a region of coverage for a sparse network almanac includes means for receiving a base station almanac with information for a plurality of base stations, wherein the information for each base station in the plurality of base stations includes a cell identifier that includes a level 3 (L3) region code that is one layer above a cell tower identification level; means for determining cell boundaries from the information for each base station; and means for using the cell boundaries from the information for each base station to estimate a region of coverage for an L3 sparse network almanac (SNA).

In one implementation, a non-transitory computer-readable medium for estimating a region of coverage for a sparse network including program code stored thereon, includes program code to receive a base station almanac with information for a plurality of base stations, wherein the information for each base station in the plurality of base stations includes a cell identifier that includes a level 3 (L3) region code that is one layer above a cell tower identification level; program code to determine cell boundaries from the information for each base station; and program code to use the cell boundaries from the information for each base station to estimate a region of coverage for an L3 sparse network almanac (SNA).

DETAILED DESCRIPTION

Figure 1:
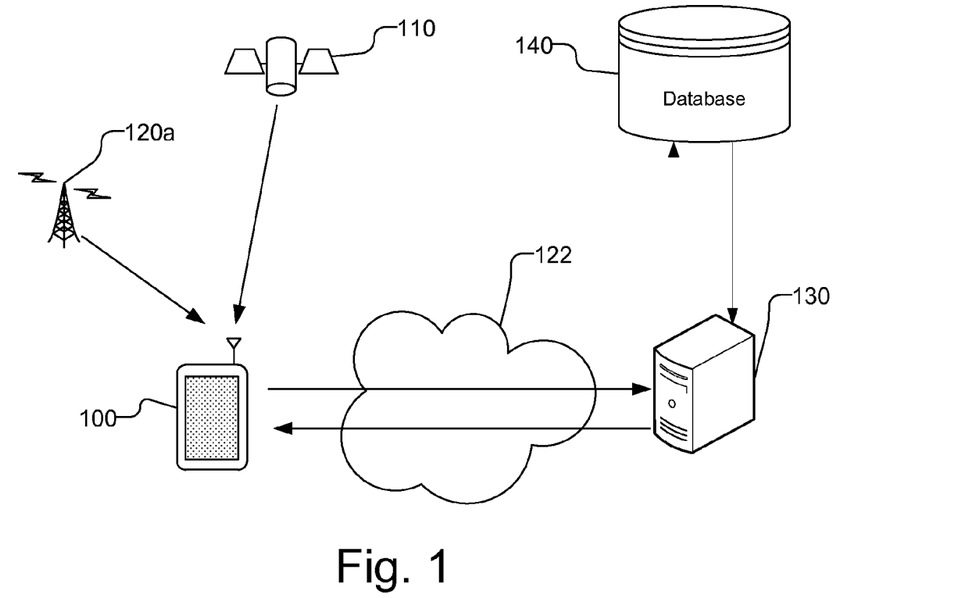
FIG. 1 illustrates a system that includes a server capable of generating a sparse network almanac database based on a level 3 region code that is one layer above a cell tower identification level.

FIG. 1 illustrates a system that includes a server 130 capable of generating a sparse network almanac (SNA) database 140 based on a level 3 (L3) region code that is one layer above a cell tower identification level and a mobile device 100 capable of receiving a rough position estimate based on information obtained from the L3 SNA. The mobile device 100 wirelessly communicates with the base station 120a and obtains a cell identifier from the base station 120a. The mobile device 100 may communicate the cell identifier to a server 130, via wireless network 122, and server 130 may provide a rough position estimate to the mobile device 100 based on information corresponding to the cell identifier that is stored in the SNA database 140. The wireless network 122 may be provided through the base station 120a or through other access points, including a Wireless Local Area Network (WLAN). The rough position estimate may be used in applications such as, but not limited to assisting in obtaining a position fix from a SPS system, illustrated by satellite 110, which may be, e.g., a Global Navigation Satellite System (GNSS) such as Global Positioning System (GPS), Galileo, Glonass or Compass or a regional system, such as, e.g., Quasi-Zenith Satellite System (QZSS) over Japan, Indian Regional Navigational Satellite System (IRNSS) over India, Beidou over China, etc.

The database 140 may also include a BS almanac, which may be accessed via wireless network 122 based on the cell identifier. The BS almanac includes a location for each base station and a cell coverage area associated with each base station. Thus, by providing a cell identifier of the base station with which the mobile device 100 is in wireless communication, an approximate position estimate of the mobile device 100 may be the provided based on the location of the base station and the associated cell coverage area. If, however, the base station 120a is new to the wireless network or has not yet been added to the BS almanac, the BS almanac will not include the location and cell coverage area that corresponds to the base station 120a. Accordingly, the server 130 cannot provide the mobile device 100 with an approximate position estimate from the BS almanac. The cell identifier provided by the base station 120a, however, includes additional identifying information that is stored in the SNA database 140 along with a corresponding region of coverage. Accordingly, the SNA database 140 may be accessed using information from the cell identifier and a rough position estimate may be provided to the mobile device 100 from the SNA database 140, even if the base station has not been included in the BS almanac.

The hierarchical structure of a cell identifier for a wireless wide area network (WWAN) network typically includes four layers. Table 1, by way of example, illustrates the four typical layers used in a cell identifier for wireless networks including Global System for Mobile Communications (GSM), Code Division Multiple Access (CDMA) network, Wideband-CDMA (W-CDMA), Time Division Synchronous Code Division Multiple Access (TD-SCDMA), and Long Term Evolution (LTE).

TABLE 1

| Network | Level 1 | Level 2 | Level 3 | Level 4 |
| --- | --- | --- | --- | --- |
| GSM | Mobile Country Code (MCC) | Mobile Network Code (MNC) | Location Area Code (LAC) | Cell Identity (CI) |
| CDMA | System Identification (SID) | | Network Identification (NID) | Base Station Identification (BASEID) |
| W-CDMA | Mobile Country Code (MCC) | Mobile Network Code (MNC) | Location Area Code (LAC) | Universal Cell Identification (UC-ID) |
| TD-SCDMA | Mobile Country Code (MCC) | Mobile Network Code (MNC) | Location Area Code (LAC) | Universal Cell Identification (UC-ID) |
| LTE | Mobile Country Code (MCC) | Mobile Network Code (MNC) | Tracking Area Code (TAC) | Cell Identity (CI) |

In general, the level 4 layer uniquely identifies the network cell or base station. The level 3 layer is more general and identifies a Location Area, which may be associated with several cells or base stations. Thus, the level 3 layer uniquely identifies a geographic area, but is non-unique with respect to a single base station. The level 2 and level 1 layers are used to, e.g., identify the network and country, respectively. As can be seen in Table 1, the cell identifier for the CDMA network includes three levels, System Identification (SID), Network Identification (NID), and Base Station Identification (BASEID), but for purposes of this disclosure, as used herein, level 3 refers to one layer above the cell tower level, and thus, the NID for CDMA is considered level 3.

Thus, the level 4 layer is typically used to uniquely identify base stations in a BS almanac. When a mobile device 100 is in contact with a base station 120a, the mobile device 100 acquires the cell identifier for the base station 120a, including all four (or three) identifier levels, including level 3 and level 4, e.g., Location Area Code (LAC) and Cell Identify (CI) for a GSM network. The level 4 layer, e.g., CI, may be used to uniquely identify the base station 120a in the BS almanac, if the base station 120a is included in the BS almanac. If the base station 120a is not include in the BS almanac, the level 4 layer, e.g., CI, for the base station 120a will not be present in the BS almanac, and thus, the BS almanac cannot be used to provide an approximate position estimate for the mobile device 100.

The SNA database 140, however, may store the level 3 layer (as well as level 2 and level 1 if desired) along with an associated estimated region of coverage. While the region of coverage associated with a level 3 layer typically includes multiple base stations, and thus, will be much larger than the cell coverage area associated with a single base station, the region of coverage may provide a rough position estimate for the mobile device 100 that is small enough to be useful in applications such as a satellite search. Accordingly, even if the base station 120a is new and not included in a BS almanac, the level 3 layer provided by the base station 120a in the cell identifier may be used to query the SNA database 140 to provide a rough position estimate based on the associated region of coverage for the identified level 3 layer.

Figure 2:
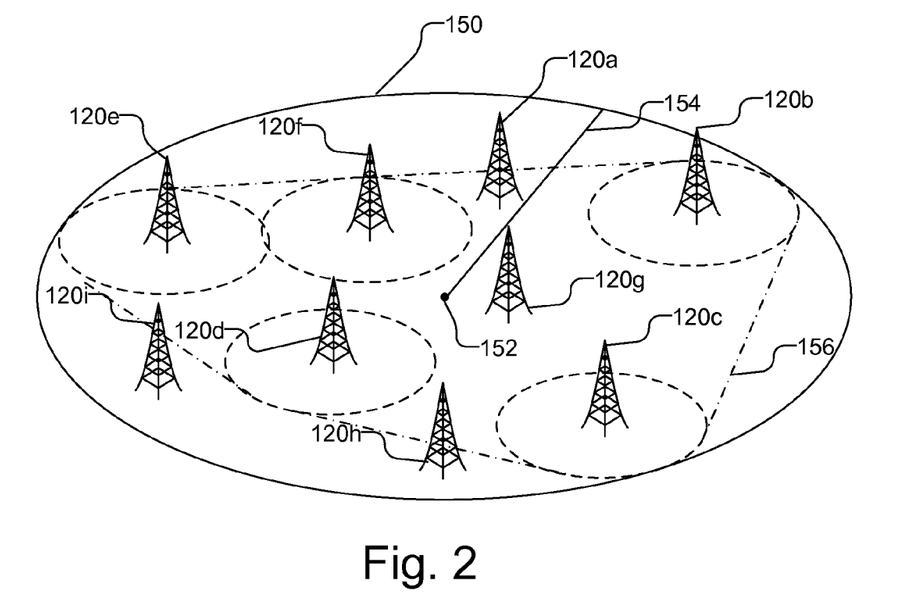
FIG. 2 illustrates a plurality of base stations within the same level 3 region with an estimated region of coverage.

FIG. 2, by way of example, illustrates a plurality of base stations 120a-120i, each of which is within the same level 3 region that is within an estimated region of coverage 150. A number of base stations 120b-120f are illustrated with dotted circles around the center of the base station, to indicate that the cell boundaries for these base stations are known, and are stored in a BS almanac database. The cell boundaries for the remaining base stations 120a, 120g, 120h, and 120i, however, are unknown and these base stations are not stored in a BS almanac database. Nevertheless, each of the base stations 120a-120i are within the same level 3 layer. The SNA database 140 associates the level 3 identity for the base stations 120a-120i with the region of coverage 150 for that level 3 identity. As can be seen in FIG. 2, while the cell boundaries for each of the base stations is relatively small and, thus, more precise than the region of coverage 150 of the level 3, the region of coverage of the level 3 region of coverage 150 may still be useful for providing an approximate position fix to the mobile device, e.g., to reduce the satellite search time for an SPS position fix. By way of example, a region of coverage for a level 3 region may have a radius of, e.g., 75 km, which is small enough to drastically reduce the number of satellites to be searched during a cold start.

Typically, the region of coverage for a level 3 layer is not publically available. The SNA database 140, however, can be produced using data from a BS almanac, which may be obtained through, e.g., crowdsourced data aggregation, third party databases, manually created, or otherwise provided.

Figure 3:
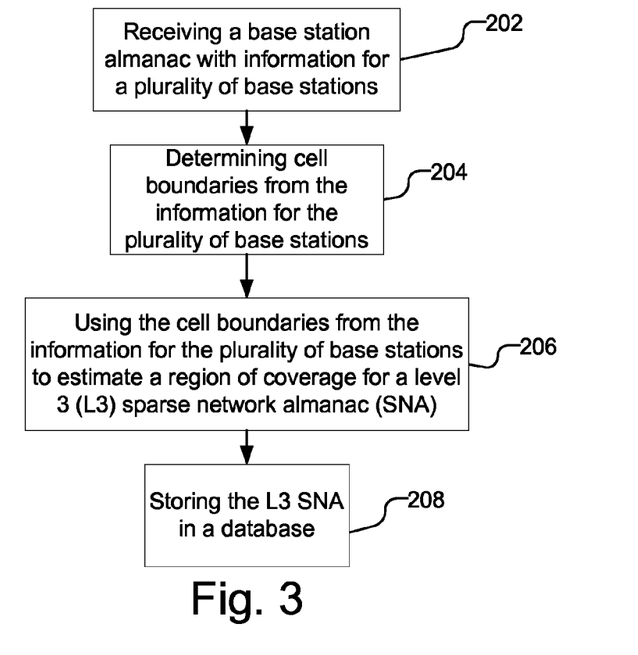
FIG. 3 is a flow chart illustrating a method of estimating a region of coverage for a level 3 sparse network almanac based on a base station almanac with information for a plurality of base stations.

FIG. 3 is a flow chart illustrating a method of estimating a region of coverage for a level 3 SNA based on almanac information for a plurality of base stations. As can be seen, a base station almanac with information for a plurality of base stations is received (202). The information for each base station in the plurality of base stations includes a cell identifier that includes a level 3 (L3) region code that is one layer above a cell tower identification level. The base station almanac may be received, e.g., by at least one of crowdsourcing the information for the plurality of base stations or by accessing a purchased database that includes the base station almanac, etc. Cell boundaries are determined from the information for the plurality of base stations (204). The cell boundaries may be determined from the information for the plurality of base stations, e.g., by determining an antenna location for each base station and determining a cell boundary from the antenna location and cell antenna parameters for each base station. The cell boundaries from the information for the plurality of base stations may then be used to estimate a region of coverage for an L3 sparse network almanac (SNA) (206), which is stored in a database (208). For example, the region of coverage for the L3 SNA may be estimated to include the cell boundaries from the information for the plurality of base stations.

The cell boundaries from the information for each base station may be used to estimate the region of coverage for the L3 SNA by generating region points that comprise the cell boundaries and using the region points to estimate the region of coverage for the L3 SNA. For example, the region points may be used to estimate the region of coverage for the L3 SNA by finding a minimum enclosing circle, e.g., a center of the region points may be determined and a circle may be defined around the center of the region points based on a distance between the center of the region points and a farthest region point. FIG. 2, by way of example, illustrates estimating a region of coverage 150 for an L3 SNA by finding an enclosing circle of all known cells by estimating a center 152 and a radius 154 to the farthest region point.

Figure 4:
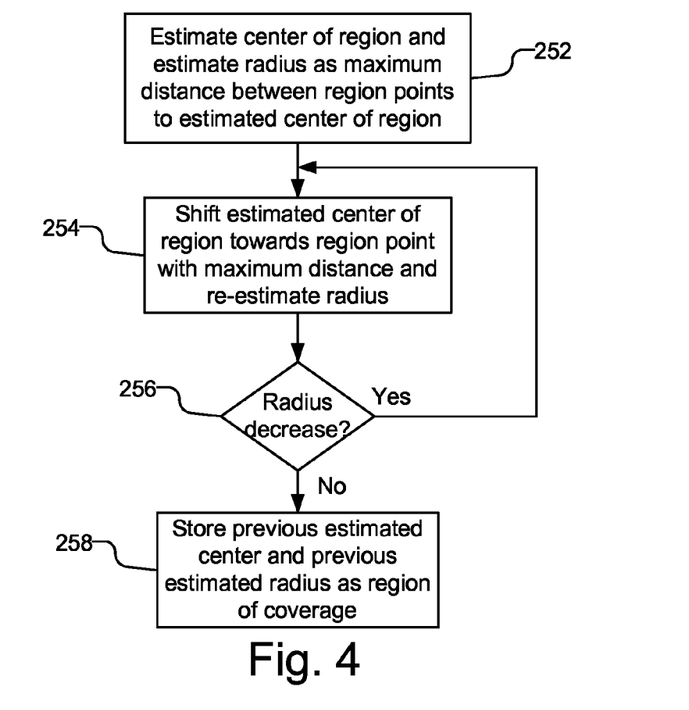
FIG. 4 is a flow chart illustrating a method of estimating the region of coverage using a center of the region points and a circle enclosing the region points.

FIG. 4 is a flow chart illustrating, by way of example, a method of estimating the region of coverage using a center of the region points and a circle enclosing the region points. As illustrated in (252), the center of the region is estimated and a radius is estimated as the maximum distance between the region points to the estimated center of the region. By way of example, the center of the region may be estimated as a point midway between the maximum and minimum coordinates of region points in the North/South direction and East/West direction. With the radius estimated as the maximum distance between the region points to the estimated center of the region, the estimated center of the region is shifted, e.g., by 1 km, towards the region point with the maximum distance (254). The radius is then re-estimated as the maximum distance between the region points to the current estimated center of the region (254). If the estimated radius decreases (256), the process repeats by shifting the current estimated center of the region and re-estimating the radius (254). If the estimated radius does not decrease (256), the process stops and the previous estimated center of the region and estimated radius are stored as the region of coverage (258). It should be understood that the above-described process may be performed in any desired coordinate systems, such as North East Down (NED) coordinates, or in latitude/longitude/terrain height coordinates. Moreover, the mean value of the cell terrain height may be used as an estimated terrain height for the region of coverage.

Other methods of determining the region of coverage may be used as well. For example, as illustrated in FIG. 2, a region of coverage may be defined as an area bounded tangent lines between the cell boundaries, illustrated by lines 156.

As the region of coverage of the L3 SNA is based on the information for each base station in the base station almanac, the accuracy of the base station almanac is important in order to correctly define the region of coverage. One way to ensure accuracy of the base station almanac is to place a threshold on the age of the base station almanac as outdated data may be incorrect. For example, a threshold may be used to limit base station almanac input data to only data with a timestamp that is within designated amount of time from the current time, e.g., 10 days or between 1 and 100 days. By comparing the timestamp on data to a threshold prevents old and possibly outdated data from being used in the level 3 SNA generation.

Additionally, not all relevant base stations may be included in the base station almanac when determining the region of coverage for the L3 SNA. Accordingly, the resulting estimated region of coverage may be significantly smaller than the actual coverage area of the L3 SNA, e.g., an unknown base station may exist outside the estimated region of coverage. An underestimation of the region of coverage of the L3 SNA may result in a rough position fix that is too small. For example, a mobile device may be within the actual L3 coverage area, but may be outside the estimated region of coverage for the L3 SNA. If the estimated region of coverage is too small, the rough position fix provided to a mobile device will be too small and, consequently, the mobile device may incorrectly exclude visible satellites during a satellite search. Accordingly, a default region size parameter, e.g., radius, area, etc., may be used for a region of coverage if the estimated region of coverage is below a threshold size.

Figure 5:
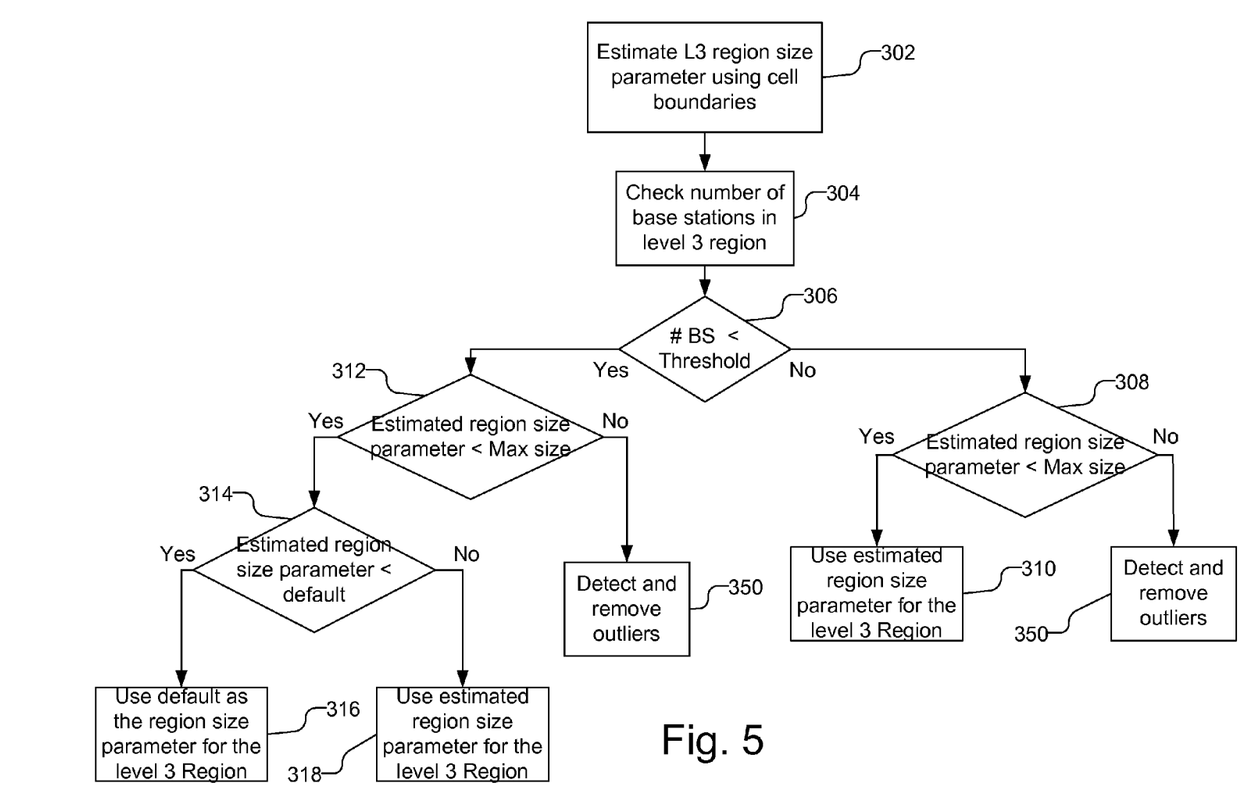
FIG. 5 is a flow chart illustrating a method of using the cell boundaries to estimate the region of coverage for the level three sparse network almanac ensuring that the region of coverage is larger than a minimum size and detecting and removing base station outliers.

FIG. 5 is a flow chart illustrating a method of using the cell boundaries from the information for each base station to estimate the region of coverage for the L3 SNA from 206 in FIG. 3, including ensuring that the region of coverage is larger than a minimum size and detecting and removing base station outliers. As illustrated, a size parameter of the L3 region of coverage is estimated using the cell boundaries from the information for each base station (302). As discussed above, the size parameter may be the radius of a circle that encompasses the cell boundaries or an area defined by the cell boundaries, e.g., the area of the enclosing circle or an area formed by tangent lines between boundaries, or any other desired size parameter. If desired, the number of base stations used to estimate the level 3 region of coverage may be determined and compared to a threshold (304 and 306). A threshold for base stations may be, e.g., 50, but may be as low as 1 or as much as 2000 or more. If the number of base stations used to estimate the level 3 region of coverage is not less than the threshold, i.e., the number of base stations is equal to or greater than the threshold, the estimated region size parameter is compared to a maximum size (308). The maximum size for the estimated region size parameter may be dependent on the particular wireless network to which the level 3 region belongs. By way of example, the maximum size may be twice the largest known size parameter for level 3 regions in the wireless network. In some implementations, the maximum size may be 500 km for CDMA and LTE networks and 300 km for GSM and WCDMA networks, but the maximum size may be set between 100 km and 1,000 km if desired. If the estimated region size parameter is less than the maximum size, the estimated region size parameter may be used for the level 3 region of coverage (310). On the other hand, if the estimated region size parameter is larger than (or equal to) the maximum size, the level 3 region may be flagged as having wrong input data and feedback provided to an operator and if desired, outliers may be detected and removed (350) as discussed below.

If the number of base stations used to estimate the level 3 region of coverage is less than the threshold (306), the estimated region size parameter is also compared to a maximum size (312), and if the estimated region size parameter is larger than (or equal to) the maximum size, then the level 3 region may be flagged as having wrong input data and feedback provided to an operator and if desired, outliers may be detected and removed (350) as discussed below. If the estimated region size parameter is less than the maximum size (312), the estimated region size parameter may be compared to a default size (314). As discussed above, a default size is used to prevent the region of coverage from being too small. The default size for the estimated region size parameter may be set so that a desired percentage of level 3 regions in a particular wireless network is smaller than the default size. For example, the default size may be set so that 50% to 90% of level 3 regions are smaller. In some implementations, the default size may be 300 km for CDMA and LTE networks, but may be set between 500 km and 100 km if desired, and the default size may be 100 km for GSM and WCDMA networks, but may be set between 30 km and 500 km, if desired. If the estimated region size parameter is less than the default size (314), the default size may be used for the level 3 region of coverage (316). If the estimated region size parameter is greater than (or equal to) the default size (314), the estimated region size parameter may be used for the level 3 region of coverage (318).

Accordingly, as can be seen in FIG. 5, using the cell boundaries to estimate the region of coverage for the L3 SNA includes determining an estimated region size parameter using the cell boundaries from the information for each base station (302) and using the estimated region size parameter for the region of coverage if the estimated region size parameter is larger than a default region size parameter (318). If the estimated region size parameter is smaller than the default region size parameter, the default region size parameter is used for the region of coverage (316). Moreover, as there may be outlier base stations in a given level 3 SNA, using the cell boundaries to estimate the region of coverage for the L3 SNA includes detecting and removing outliers in the plurality of base stations (350).

Figure 6:
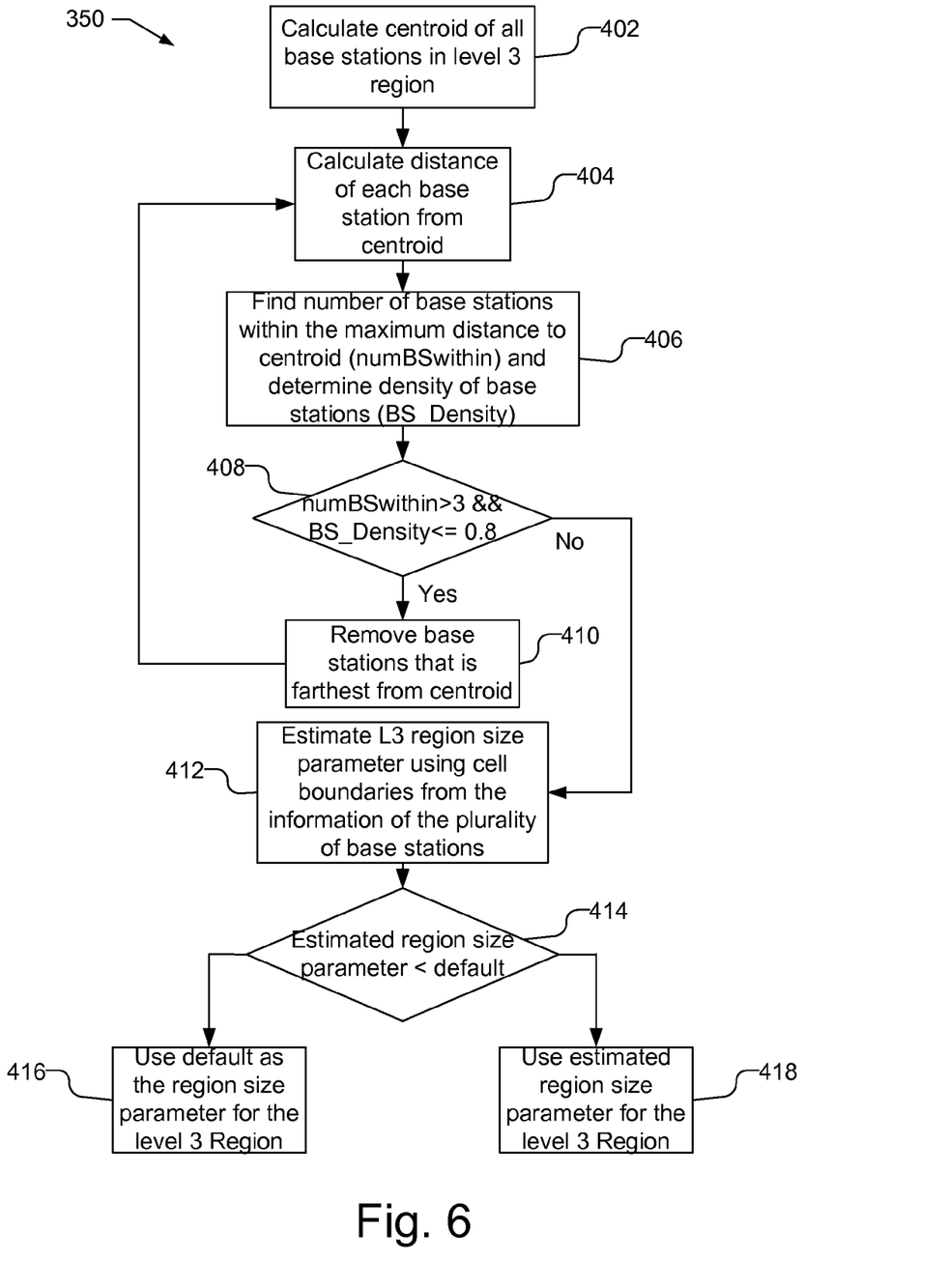
FIG. 6 is a flow chart illustrating a method of detecting and removing outliers while determining the region of coverage.

FIG. 6 is a flow chart illustrating a method of detecting and removing outliers from blocks 350 in FIG. 5. As illustrated, a centroid may be calculated for all the base stations in a level 3 region (402) and a distance from each base station to the centroid may be calculated (404). The number (numBSwithin) of base stations that are less than the maximum distance from the centroid is found (406). Additionally, a density of base stations (BS_Density) is determined, e.g., as the ratio of the numBSwithin with respect to the total number of base stations in the level 3 region. The number (numBSwithin) of base stations that are less than the maximum distance from the centroid and the density of the base stations are compared to thresholds (408). For example, if numBSwithin is greater than 3 (or any other desired value) and the BS_Density is less than or equal to 0.8 (or any other desired value), the farthest base station from the centroid is determined to be an outlier and is removed (410) and the process returns to calculate the distance of each base station from the centroid (404). If desired, the centroid may be recalculated (402). Thus, as can be seen in FIG. 6, outliers are detected in the plurality of base stations (402-408) and the outliers are removed (410). Once the numBSwithin is not greater than 3 (or any other desired value) and the BS_Density is not less than or equal to 0.8 (or any other desired value), the cell boundaries from the information for each base station with the outliers removed are used to estimate the region of coverage for the level 3 SNA (412-418), which may be performed as discussed above. The cell boundaries from the information for each base station with the outliers removed may be used to estimate the region of coverage for the L3 SNA by estimating a region size parameter using the cell boundaries from the information for each base station with the outliers removed (412). The estimated region size parameter is compared to the default size (414) and the default region size parameter for the region of coverage is used if the estimated region size parameter is smaller than the default region size parameter (416) and the estimated region size parameter for the region of coverage is used if the estimated region size parameter is larger than a default region size parameter (418).

Figure 7:
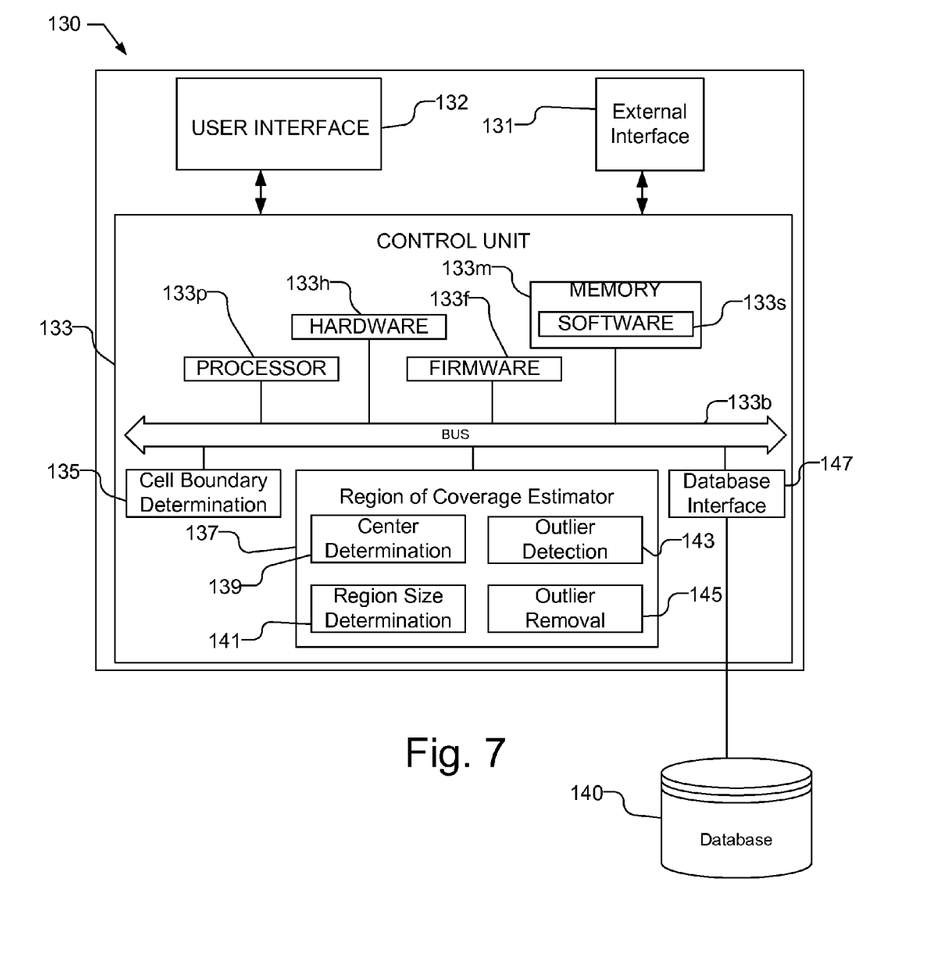
FIG. 7 is a block diagram of the server capable of estimating a region of coverage for a level 3 sparse network almanac based on a base station almanac with information for a plurality of base stations.

FIG. 7 is a block diagram of the server 130 capable of estimating a region of coverage for a level 3 SNA based on a base station almanac with information for a plurality of base stations. The server 130 includes an external interface 131 that may be used to communicate with mobile devices to a mobile device to provide a rough position estimate based on a level 3 cell identifier provided by the mobile device. The external interface 131 may be used to receive a base station almanac, e.g., by receiving a database that includes information for a plurality of base stations. If desired, the server 130 may produce the base station almanac from, e.g., crowdsourced data, received from mobile devices through the external interface 131 and store the base station almanac in database 140. The server 130 may further include a user interface 132 that may include e.g., a display, as well as a keypad or other input device through which the user can input information into the server 130.

The external interface 131 may be a wired interface coupled to a router (not shown) or a wireless interface used in any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATS) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The server 130 also includes a control unit 133 that is connected to and communicates with the external interface 131 and database 140. The control unit 133 receives and processes the base station almanac from, e.g., external interface 131 or database 140 to produce the L3 sparse network almanac (SNA) stored in database 140, as discussed above. The control unit 133 may be provided by a bus 133$b$, processor 133$p$ and associated memory 133$m$, hardware 133$h$, firmware 133$f$, and software 133$s$. The control unit 133 is further illustrated as including cell boundary determination module 135 that determines cell boundaries from the information for each base station in the plurality of base stations as discussed above with respect to FIG. 3. The control unit further includes a region of coverage estimator module 137, which estimates the region of coverage for the L3 SNA from the cell boundaries as discussed above with respect to FIG. 3. As illustrated, the region of coverage estimator module 137 may include a center determination module 139 that is used to estimate a center of regions points on the cell boundaries and a region size determination module 141 that is used determining an estimated region size parameter, such as a circle that includes the region points, as discussed above with respect to FIG. 4. The region of coverage estimator module 137 may further include an outlier detection module 143 and an outlier removal module 145 to detect and remove outliers as discussed above with respect to FIG. 6. A database interface 147 is used to interface with the database 140 to store the resulting L3 SNA, and may be used to receive a base station almanac if stored in the database 140 as discussed above with respect to FIG. 3.

The modules 135, 137, and 147 are illustrated separately from processor 133$p$ for clarity, but may be part of the processor 133$p$ or implemented in the processor based on instructions in the software 133$s$ which is run in the processor 133$p$. Moreover, database 140 is illustrated as being external to the control unit 133, but may be external to the control unit 133 and coupled and coupled directly to bus 133$b$ if desired.

It will be understood as used herein that the processor 133$p$ can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 133$h$, firmware 133$f$, software 133$s$, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 133$m$ and executed by the processor 133$p$. Memory 133$m$ may be implemented within or external to the processor 133$p$. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, the server 130 includes a means for receiving a base station almanac with information for a plurality of base stations, wherein the information for each base station in the plurality of base stations includes a cell identifier that includes a level 3 (L3) region code that is one layer above a cell tower identification level, which may be, e.g., the external interface 131 or a database interface 147. A means for determining cell boundaries from the information for each base station may include, e.g., cell boundary determination module 135. A means for using the cell boundaries from the information for each base station to estimate a region of coverage for an L3 sparse network almanac (SNA) may be, e.g., the region of coverage estimator module 137. The means for using the cell boundaries from the information for each base station to estimate the region of coverage for the L3 SNA may generate region points that comprise the cell boundaries and use the region points to estimate the region of coverage for the L3 SNA. The means for using the cell boundaries from the information for each base station to estimate the region of coverage for the L3 SNA may include a means for determining a center of the region points, which may be, e.g., the center determination module 139, and a means for defining a circle around the center of the region points based on a distance between the center of the region points and a farthest region point, which may be, the region size determination module 141. The means for using the cell boundaries from the information for each base station to estimate the region of coverage for the L3 SNA may include means for determining an estimated region size parameter using the cell boundaries, which may be, e.g., the region size determination module 141. A means for using the estimated region size parameter for the region of coverage if the estimated region size parameter is larger than a default region size parameter and the default region size parameter for the region of coverage if the estimated region size parameter is smaller than the default region size parameter may be, e.g., the region size determination module 141. The means for using the cell boundaries from the information for each base station to estimate the region of coverage for the L3 SNA may further include means for detecting outliers, which may be, the outlier detection module 143, and means for removing the outliers, which may be the outlier removal module 145, wherein the cell boundaries from the information for each base station with the outliers removed are used to estimate the region of coverage for the L3 SNA. A means for storing the L3 SNA in a database may be, e.g., the database interface 147.

Although various aspects of the invention are illustrated in connection with specific embodiments for instructional purposes, various aspects of the invention are not limited thereto. Various adaptations and modifications may be made without departing from the scope of the invention. Therefore, the spirit and scope of the appended claims should not be limited to the foregoing description.

What is claimed is:

1. A method of estimating a region of coverage for a sparse network almanac, the method comprising:
   receiving a base station almanac with information for a plurality of base stations, wherein the information for each base station in the plurality of base stations includes a cell identifier that includes a level 3 (L3) region code that is one layer above a cell tower identification level;
   determining cell boundaries from the information for each base station; and
   using the cell boundaries from the information for each base station to estimate a region of coverage for an L3 sparse network almanac (SNA).

2. The method of claim 1, wherein using the cell boundaries from the information for each base station to estimate the region of coverage for the L3 SNA comprises:
   generating region points that comprise the cell boundaries; and
   using the region points to estimate the region of coverage for the L3 SNA.

3. The method of claim 2, wherein using the region points to estimate the region of coverage for the L3 SNA comprises:
   determining a center of the region points; and
   defining a circle around the center of the region points based on a distance between the center of the region points and a farthest region point.

4. The method of claim 1, wherein using the cell boundaries from the information for each base station to estimate the region of coverage for the L3 SNA comprises:
   determining an estimated region size parameter using the cell boundaries; and
   using the estimated region size parameter for the region of coverage if the estimated region size parameter is larger than a default region size parameter.

5. The method of claim 4, further comprising using the default region size parameter for the region of coverage if the estimated region size parameter is smaller than the default region size parameter.

6. The method of claim 1, wherein using the cell boundaries from the information for each base station to estimate the region of coverage for the L3 SNA comprises:
   detecting outliers in the plurality of base stations;
   removing the outliers in the plurality of base stations;
   using the cell boundaries from the information for each base station with the outliers removed to estimate the region of coverage for the L3 SNA.

7. The method of claim 6, wherein using the cell boundaries from the information for each base station with the outliers removed to estimate the region of coverage for the L3 SNA comprises:
   determining an estimated region size parameter using the cell boundaries from the information for each base station with the outliers removed; and
   using the estimated region size parameter for the region of coverage if the estimated region size parameter is larger than a default region size parameter; and
   using the default region size parameter for the region of coverage if the estimated region size parameter is smaller than the default region size parameter.

8. The method of claim 1, wherein receiving the base station almanac comprises at least one of crowdsourcing the information for the plurality of base stations or purchasing the base station almanac.

9. The method of claim 1, wherein determining the cell boundaries from the information for each base station comprises:
   determining an antenna location for each base station; and
   determining a cell boundary from the antenna location and cell antenna parameters for each base station.

10. The method of claim 1, further comprising storing the L3 SNA in a database.

11. An apparatus for estimating a region of coverage for a sparse network almanac, the apparatus comprising:
   an external interface configured to receive a base station almanac with information for a plurality of base stations; and
   a processor configured to determine cell boundaries from the information for each base station in the plurality of base stations, and to use the cell boundaries from the information for each base station to estimate a region of coverage for a level 3 (L3) sparse network almanac (SNA).

12. The apparatus of claim 11, wherein the processor is configured to use the cell boundaries from the information for each base station to estimate the region of coverage for the L3 SNA by being configured to:
   generate region points that comprise the cell boundaries; and
   use the region points to estimate the region of coverage for the L3 SNA.

13. The apparatus of claim 12, wherein the processor is configured to use the region points to estimate the region of coverage for the L3 SNA by being configured to:
   determine a center of the region points; and
   define a circle around the center of the region points based on a distance between the center of the region points and a farthest region point.

14. The apparatus of claim 11, wherein the processor is configured to use the cell boundaries from the information for each base station to estimate the region of coverage for the L3 SNA by being configured to:
   determine an estimated region size parameter using the cell boundaries; and
   use the estimated region size parameter for the region of coverage if the estimated region size parameter is larger than a default region size parameter.

15. The apparatus of claim 14, wherein the processor is further configured to use the default region size parameter for the region of coverage if the estimated region size parameter is smaller than the default region size parameter.

16. The apparatus of claim 11, wherein the processor is configured to use the cell boundaries from the information for each base station to estimate the region of coverage for the L3 SNA by being configured to:
   detect outliers in the plurality of base stations;
   remove the outliers in the plurality of base stations;
   use the cell boundaries from the information for each base station with the outliers removed to estimate the region of coverage for the L3 SNA.

17. The apparatus of claim 16, wherein the processor is configured to use the cell boundaries from the information for each base station with outliers removed to estimate the region of coverage for the L3 SNA by being configured to:
   determine an estimated region size parameter using the cell boundaries from the information for each base station with the outliers removed; and
   use the estimated region size parameter for the region of coverage if the estimated region size parameter is larger than a default region size parameter; and
   use the default region size parameter for the region of coverage if the estimated region size parameter is smaller than the default region size parameter.

18. The apparatus of claim 11, wherein the external interface is configured to receive the base station almanac from at least one of crowdsourcing the information for the plurality of base stations or purchasing the base station almanac.

19. The apparatus of claim 11, wherein the processor is configured to determine the cell boundaries from the information for each base station by being configured to:
   determine an antenna location for each of each base station; and
   determine a cell boundary from the antenna location and cell antenna parameters for each base station.

20. The apparatus of claim 11, wherein the processor is further configured to store the L3 SNA in a database.

21. An apparatus for estimating a region of coverage for a sparse network almanac, the apparatus comprising:
   means for receiving a base station almanac with information for a plurality of base stations, wherein the information for each base station in the plurality of base stations includes a cell identifier that includes a level 3 (L3) region code that is one layer above a cell tower identification level;
   means for determining cell boundaries from the information for each base station; and
   means for using the cell boundaries from the information for each base station to estimate a region of coverage for an L3 sparse network almanac (SNA).

22. The apparatus of claim 21, wherein the means for using the cell boundaries from the information for each base station to estimate the region of coverage for the L3 SNA generates region points that comprise the cell boundaries and uses the region points to estimate the region of coverage for the L3 SNA.

23. The apparatus of claim 22, wherein the means for using the cell boundaries from the information for each base station to estimate the region of coverage for the L3 SNA comprises:
   means for determining a center of the region points; and
   means for defining a circle around the center of the region points based on a distance between the center of the region points and a farthest region point.

24. The apparatus of claim 21, wherein the means for using the cell boundaries from the information for each base station to estimate the region of coverage for the L3 SNA comprises:
   means for determining an estimated region size parameter using the cell boundaries; and
   means for using the estimated region size parameter for the region of coverage if the estimated region size parameter is larger than a default region size parameter and the default region size parameter for the region of coverage if the estimated region size parameter is smaller than the default region size parameter.

25. The apparatus of claim 21, wherein the means for using the cell boundaries from the information for each base station to estimate the region of coverage for the L3 SNA comprises:
   means for detecting outliers in the plurality of base stations;
   means for removing the outliers in the plurality of base stations, wherein the cell boundaries from the information for each base station with outliers removed are used to estimate the region of coverage for the L3 SNA.

26. The apparatus of claim 21, further comprising means for storing the L3 SNA in a database.

27. A non-transitory computer-readable medium for estimating a region of coverage for a sparse network almanac, the non-transitory computer-readable medium including program code stored thereon, comprising:
   program code to receive a base station almanac with information for a plurality of base stations, wherein the information for each base station in the plurality of base stations includes a cell identifier that includes a level 3 (L3) region code that is one layer above a cell tower identification level;
   program code to determine cell boundaries from the information for each base station; and
   program code to use the cell boundaries from the information for each base station to estimate a region of coverage for an L3 sparse network almanac (SNA).

28. The non-transitory computer-readable medium of claim 27, wherein the program code to use the cell boundaries from the information for each base station to estimate the region of coverage for the L3 SNA comprises:
   program code to determine a center of the region points; and
   program code to define a circle around the center of the region points based on a distance between the center of the region points and a farthest region point.

29. The non-transitory computer-readable medium of claim 27, wherein the program code to use the cell boundaries from the information for each base station to estimate the region of coverage for the L3 SNA comprises:
   program code to determine an estimated region size parameter using the cell boundaries from the information for each base station;
   program code to use the estimated region size parameter for the region of coverage if the estimated region size parameter is larger than a default region size parameter and to use the default region size parameter for the region of coverage if the estimated region size parameter is smaller than the default region size parameter.

30. The non-transitory computer-readable medium of claim 27, wherein the means for using the cell boundaries from the information for each base station to estimate the region of coverage for the L3 SNA comprises:
   program code to detect outliers in the plurality of base stations;
   program code to remove the outliers in the plurality of base stations, wherein the cell boundaries from the information for each base station with the outliers removed are used to estimate the region of coverage for the L3 SNA.

31. The non-transitory computer-readable medium of claim 27, further comprising program code to store the L3 SNA in a database.

\* \* \* \* \*